United States Patent
Bi et al.

(10) Patent No.: US 7,660,606 B2
(45) Date of Patent: Feb. 9, 2010

(54) METHOD OF CONTROLLING MOBILE UNIT RESPONSE MESSAGES ON AN ACCESS CHANNEL

(75) Inventors: Qi Bi, Morris Plains, NJ (US); Yang Yang, Parsippany, NJ (US); Sigen Ye, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 412 days.

(21) Appl. No.: 11/427,639

(22) Filed: Jun. 29, 2006

(65) Prior Publication Data

US 2008/0004050 A1    Jan. 3, 2008

(51) Int. Cl.
*H04B 1/38* (2006.01)

(52) U.S. Cl. ............... 455/558; 455/226.1; 455/226.2; 455/67.13; 455/434; 455/445; 370/338; 370/342

(58) Field of Classification Search ............... 455/558, 455/226.1, 226.2, 226.3, 226.4, 67.13, 434, 455/445, 450; 370/338, 342
See application file for complete search history.

(56) References Cited

U.S. PATENT DOCUMENTS

| | | | |
|---|---|---|---|
| 7,050,773 B2 * | 5/2006 | Bi ........................... | 455/226.1 |
| 2005/0063347 A1 * | 3/2005 | Sarkkinen et al. ............ | 370/338 |
| 2006/0084432 A1 * | 4/2006 | Balasubramanian et al. | 455/434 |
| 2007/0077935 A1 * | 4/2007 | Kloppel et al. .............. | 455/450 |
| 2008/0076359 A1 * | 3/2008 | Charpentier et al. ........ | 455/63.1 |

FOREIGN PATENT DOCUMENTS

WO    WO 2004/064272 A1    7/2004

OTHER PUBLICATIONS

International Search Report and Written Opinion mailed Feb. 15, 2008.

* cited by examiner

*Primary Examiner*—Sanh D Phu
(74) *Attorney, Agent, or Firm*—Williams, Morgan & Amerson, PC

(57) ABSTRACT

The present invention provides a method for controlling mobile unit response messages. One embodiment of the method includes providing, to a mobile unit, at least one message including information indicative of at least one parameter for configuring at least one response to said at least one message for transmission over an access channel.

7 Claims, 2 Drawing Sheets

METHOD OF CONTROLLING MOBILE UNIT RESPONSE MESSAGES ON AN ACCESS CHANNEL

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of geographic areas that are conventionally referred to as cells. Each cell is associated with a base station (or access network) that provides wireless connectivity to the cell. Mobile units located in the coverage area of a cell may access the wireless communications system by establishing a wireless communication link, often referred to as an air interface, with one or more base stations. The air interface typically supports a variety of channels including dedicated channels, control channels, access channels, and the like. Dedicated (traffic) channels are logical channels allocated to an individual mobile unit for the exchange of data and/or voice signals. Control channels are common downlink (or forward link) channels used to provide information to mobile units, e.g., to alert mobile units that there is a call or data waiting for the mobile unit.

Access channels are common uplink (or reverse link) channels used for short signaling message exchanges such as call originations, responses to pages, and registrations. For example, in wireless systems such as Code Division Multiple Access (CDMA2000), Evolution Data Optimized (EVDO), Evolution Data and Voice (EVDV) and Universal Mobile Telecommunication System (UMTS), a random access channel is used by the mobile units to communicate with the access network when there is no dedicated channel assigned. A set of access channel parameters is used to control how messages are transmitted over the access channel. Some access channel parameters may be broadcast to mobile units over a common control channel. However, in that case all of the mobile units will transmit messages over the access channel according to the same broadcast access channel parameters. Some access channel parameters may also be negotiated between individual mobile units and the wireless communication system. However, these negotiations require message exchanges over either the common channel or a dedicated traffic channel between the mobile unit and the wireless communication system. Access channel parameter negotiations are both time-consuming and resource-consuming.

The wireless communication system is not typically capable of controlling access channel transmissions by the mobile unit. For example, mobile units may randomly originate and transmit messages over the access channel according to the predetermined or previously negotiated access channel parameters. For another example, multiple page messages sent on a common control (or paging or broadcast) channel may be received by multiple mobile units at approximately the same time. These page messages may therefore trigger multiple response messages from multiple mobile units that may be transmitted over the access channel according to the predetermined or previously negotiated access channel parameters. At least in part because the mobile units may be using the same access channel parameters, the response messages may be sent in the same slot on the access channel, thereby causing a collision. In the current standards, colliding response messages back off randomly and are then retransmitted at a higher power. Thus, collisions between response messages typically incur large resource costs and long delays, which may degrade performance of the wireless communication system.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for controlling mobile unit response messages. One embodiment of the method includes providing, to at least one mobile unit, at least one message including information indicative of at least one parameter for configuring at least one response to the at least one message for transmission over an access channel. Another embodiment of the method includes receiving at least one message including information indicative of at least one parameter and providing at least one response to the at least one message over an access channel. The response is configured using the at least one parameter.

BRIEF DESCRIPTION OF THE DRAWINGS

The invention may be understood by reference to the following description taken in conjunction with the accompanying drawings, in which like reference numerals identify like elements, and in which.

Figure 1:
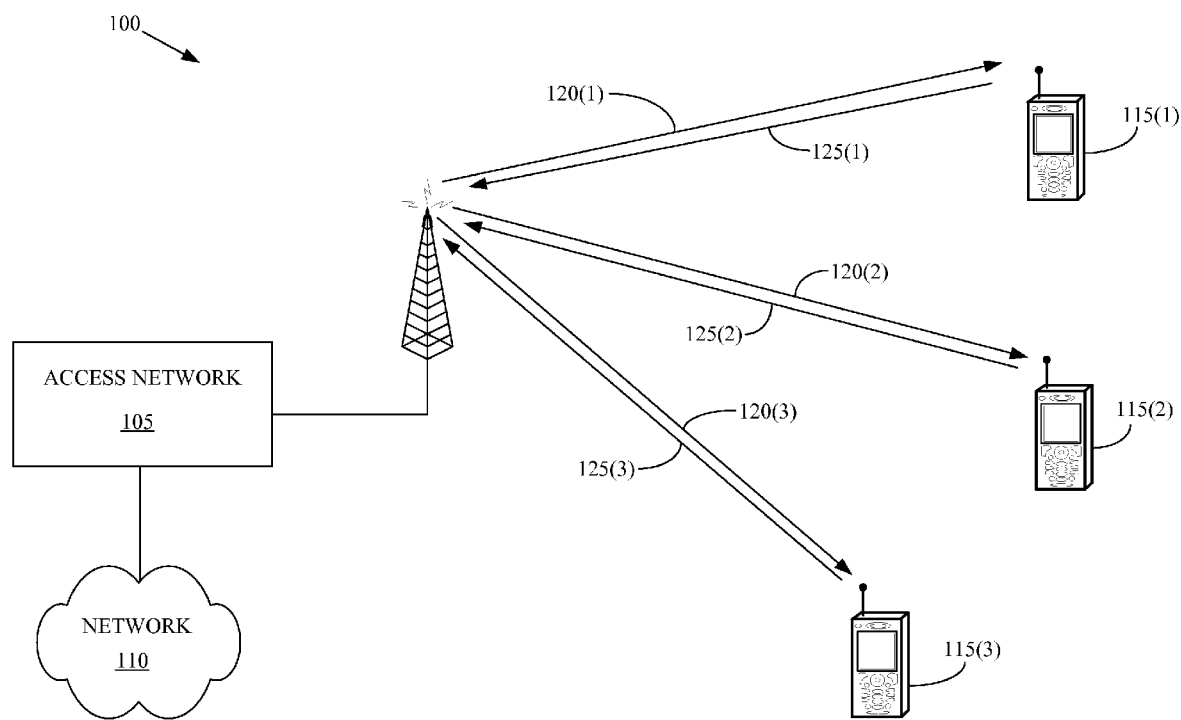
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes one or more access networks 105 for providing wireless connectivity to a network 110. The access networks 105 may provide wireless connectivity according to any wireless communication protocol. Exemplary wireless communication protocols include, but are not limited to, CDMA2000, Evolution Data Optimized (EVDO), Evolution Data and Voice (EVDV), Universal Mobile Telecommunication System (UMTS), Global System for Mobile Communications (GSM), and the like. Techniques for implementing, configuring, and/or operating the access networks 105 are known in the art and in the interest of clarity only those aspects of implementing, configuring, and/or operating the access networks 105 that are relevant to the present invention will be discussed further herein.

The access network 105 may provide wireless connectivity to one or more mobile units 115(1-3). The indices (1-3) may be used to indicate individual mobile units 115(1-3) or subsets thereof. However, the indices (1-3) may be dropped when referring to the mobile units 115 collectively. This convention may also be applied to other elements depicted in the drawings. Exemplary mobile units 115 may include cellular telephones, personal data assistants, smart phones, text messaging devices, global positioning system devices, network interface cards, notebook computers, desktop computers, and the like. Techniques for implementing, configuring, and/or operating the mobile units 115 are known in the art and in the interest of clarity only those aspects of implementing, configuring, and/or operating the mobile units 115 that are relevant to the present invention will be discussed further herein.

The mobile units 115 may communicate with the access network 105 over an air interface, which may include one or more downlink channels 120 and one or more uplink channels 125. The downlink channels 120 and uplink channels 125 may include dedicated channels, common channels, and the like. As used herein and in accordance with usage in the art, the term "dedicated channel" will be understood to refer to logical channels allocated to an individual mobile unit 115 for the exchange of data and/or voice signals. Dedicated channels may also be called traffic channels. As used herein and in accordance with usage in the art, the term "control channel" will be understood to refer to common downlink (or forward link) channels used to provide information to mobile units 115, e.g., to alert mobile units 115 that there is a call or data waiting for the mobile unit. As used herein and in accordance with usage in the art, the term "common channel" will be understood to refer to channels that are used to transmit information to one or more mobile units 115, or receive information from one or more mobile units 115, but which are not dedicated to any individual mobile unit 115.

The uplink channels 125 also include one or more access channels. As used herein and in accordance with usage in the art, the term "access channel" will be understood to refer to common uplink (or reverse link) channels. Access channels may be used for short signaling message exchanges such as call originations, responses to pages, and registrations. In one embodiment, an access channel may be a slotted random access channel that may be used for initial access into a system. For example, one or more of the mobile units 115 may initiate a call by transmitting an access request message to the access network 105 over an access channel. The messages transmitted over the access channel may be configured using one or more access channel parameters. Exemplary access channel parameters include, but are not limited to, persistence test parameters that determine how long a mobile unit 115 should wait before transmitting the first probe in a probe sequence, backoff parameters that indicate how long a mobile unit 115 should back off before attempting retransmissions following collisions, power levels for transmissions or retransmissions, the number of retransmissions that may be attempted before aborting the messages, and the like.

Mobile units 115 may also transmit messages over access channels in response to messages received from the access network 105 over one or more control channels. In various alternative embodiments, the control channels may include broadcast channels, paging channels, signalling channels, and the like, and so the messages transmitted by the access network 105 may include broadcast messages, page messages, signalling messages, short data bursts, and the like. The message transmitted by the access network 105 to one or more of the mobile units 115 may include information that may be used to configure the access channel for response messages transmitted by the mobile units 115 over access channels in response to the message transmitted by the access network 105. For example, the message transmitted by the access network 105 may include values of one or more access channel parameters. Alternatively, the configuration information, such as access channel parameters, may be transmitted as medium access control (MAC) overhead associated with the message transmitted by the access network 105. The configuration information provided in conjunction with messages transmitted by the access network 105 may override previously provided or negotiated configuration information.

In one embodiment, the access network 105 may provide the access channel configuration information in a control channel message to one or more selected mobile units 115. The access channel configuration information in different control channel messages can be same or different. For example, the access network 105 may provide the same or different persistence test parameters in different control channel messages, such that the mobile units 115 that receive these messages may transmit responses in different time slots of the access channel with very high probability.

The mobile units 115 may then use the configuration information provided by the access network 105 to configure a response to the message transmitted by the access network 105. For example, if the access network 105 transmits a page message to a mobile unit 115, the access channel configuration information may include one or more persistence test parameters. The mobile unit may then use the included persistence test parameters to determine when to transmit responses to the page message over the access channels. Thus, for multiple page messages sent at the same time, the responses may be coordinated so that the response messages will be sent back in different access slots to reduce the incidence of collisions between responses to the page messages transmitted by the access network 105. In one embodiment, access channel messages that are not transmitted in response to the message transmitted by the access network 105 are not configured according to the access channel configuration information associated with a message transmitted by the access network 105.

Figure 2:
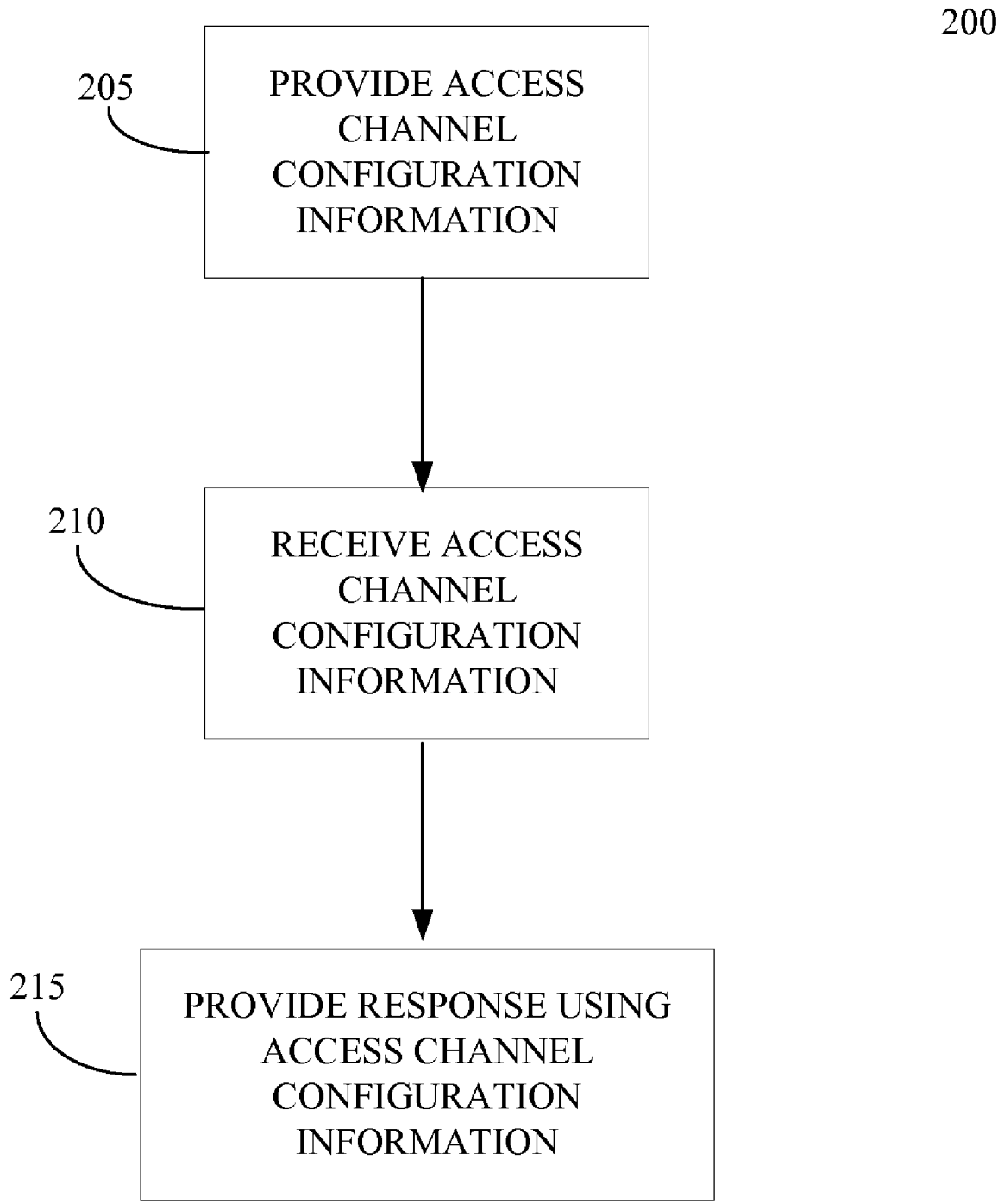
FIG. 2 conceptually illustrates one exemplary embodiment of a method for controlling mobile unit response messages on an access channel, in accordance with the present invention.

FIG. 2 conceptually illustrates one exemplary embodiment of a method 200 for controlling mobile unit response messages on an access channel. In the illustrated embodiment, access channel configuration information is provided (at 205) in conjunction with a message sent over a downlink (or forward link) common channel. For example, in a wireless communication system that operates according to EVDO, an access network may provide one page message to each mobile unit that is a part of a push-to-talk group call. The access network may also provide (at 205) access channel configuration information in each page message, such as values of the persistence test parameter, to the selected mobile unit. For example, the page message may include one or more fields for providing (at 205) the access channel configuration information. Alternatively, as discussed above, the access channel configuration information may be provided (at 205) as overhead. The values of the persistence test parameter may be determined based upon the group called size and/or any other available information.

The access channel configuration information is then received (at 210). For example, each mobile unit in the push-to-talk group described above may receive (at 210) the page message that was directed to the selected mobile unit and that includes values of the persistence test parameter. Alternatively, the mobile unit may receive (at 210) the values of the persistence test parameter as overhead associated with the page message. A response may be provided (at 215) over an access channel using the access channel configuration information. For example, the mobile units in the push-to-talk group described above may use the provided persistence test values to determine when to transmit a response, such as a connection request message, over the access channel. In one embodiment, the provided persistence test value may override a previously provided or negotiated persistence test value. By providing appropriate values of the persistence test parameter to the mobile units, the response messages, such as connection request messages, may be transmitted in different access channel cycles, thereby avoiding collisions, improving access channel performance, and reducing latency.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
generating, in an access network, a plurality of messages for transmission to a plurality of mobile units, each of the messages being configured to elicit a response from a corresponding one of the plurality of mobile units, the responses being transmitted over an access channel;
generating, in the access network, information indicative of a plurality of parameters for configuring the responses to each of the messages;
transmitting, from the access network to the plurality of mobile units, the plurality of messages in conjunction with transmitting the information indicative of the plurality of parameters, each message including different parameters such that each mobile unit can respond to its corresponding message using the parameters transmitted in conjunction with its corresponding message.

2. The method of claim 1, wherein transmitting the messages in conjunction with transmitting the information indicative of the parameters comprises providing the messages over a common channel, wherein each message includes a field containing the information indicative of the parameters to be used by the mobile unit that receives each message.

3. The method of claim 2, wherein transmitting the messages in conjunction with transmitting the information indicative of the parameters comprises transmitting the messages over at least one of a control channel, a broadcast channel, and a paging channel concurrently with transmitting the information indicative of the parameters as overhead.

4. The method of claim 1, wherein transmitting the information indicative of the parameters comprises transmitting information indicative of a plurality of access channel parameters.

5. The method of claim 4, wherein transmitting the information indicative of the access channel parameters comprises transmitting information indicative of at least one of a persistence parameter, a backoff parameter, a timing parameter, a power control parameter, and a retransmission parameter.

6. The method of claim 1, further comprising receiving a plurality of responses over the access channel, the responses being configured using the information indicative of the parameters so that the responses are sent back in different access slots.

7. The method of claim 6, wherein receiving the responses comprises receiving the responses over a random access channel, each response being configured using the information indicative of the parameters that are to be used by the mobile unit indicated in the corresponding message.

* * * * *

UNITED STATES PATENT AND TRADEMARK OFFICE
CERTIFICATE OF CORRECTION

PATENT NO. : 7,660,606 B2
APPLICATION NO. : 11/427639
DATED : February 9, 2010
INVENTOR(S) : Bi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this

Twenty-eighth Day of December, 2010

David J. Kappos
*Director of the United States Patent and Trademark Office*